(12) United States Patent
Heller et al.

(10) Patent No.: US 7,352,946 B2
(45) Date of Patent: Apr. 1, 2008

(54) FIBER SUB-SYSTEM FOR A SHELF

(75) Inventors: Deborah H. Heller, Raleigh, NC (US); Suleyman O. Sumer, Raleigh, NC (US); James X. Torok, Raleigh, NC (US); Thomas DiVittorio, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 133 days.

(21) Appl. No.: 11/334,910

(22) Filed: Jan. 19, 2006

(65) Prior Publication Data

US 2007/0165994 A1    Jul. 19, 2007

(51) Int. Cl.
*G02B 6/00*  (2006.01)
(52) U.S. Cl. ............................. 385/135; 385/134
(58) Field of Classification Search ............... 385/14, 385/24, 134–136, 88–94
See application file for complete search history.

(56) References Cited

U.S. PATENT DOCUMENTS 6,796,716 B1* 9/2004 Handforth et al. ............ 385/53

* cited by examiner

*Primary Examiner*—Hemang Sanghavi
(74) *Attorney, Agent, or Firm*—Fogg & Powers LLC

(57) ABSTRACT

A fiber sub-system is provided. The fiber sub-system comprises a fiber optic transmission module, one or more contact boards adapted to couple to shelf interface connectors, and a midplane adapted to couple with the one or more contact boards and the fiber optic transmission module enabling communication between the one or more contact boards and the fiber optic transmission module without requiring modifications to the fiber optic transmission module. The fiber sub-system also comprises a shell for encapsulating the fiber optic transmission module, the one or more contact boards, and the midplane.

43 Claims, 2 Drawing Sheets

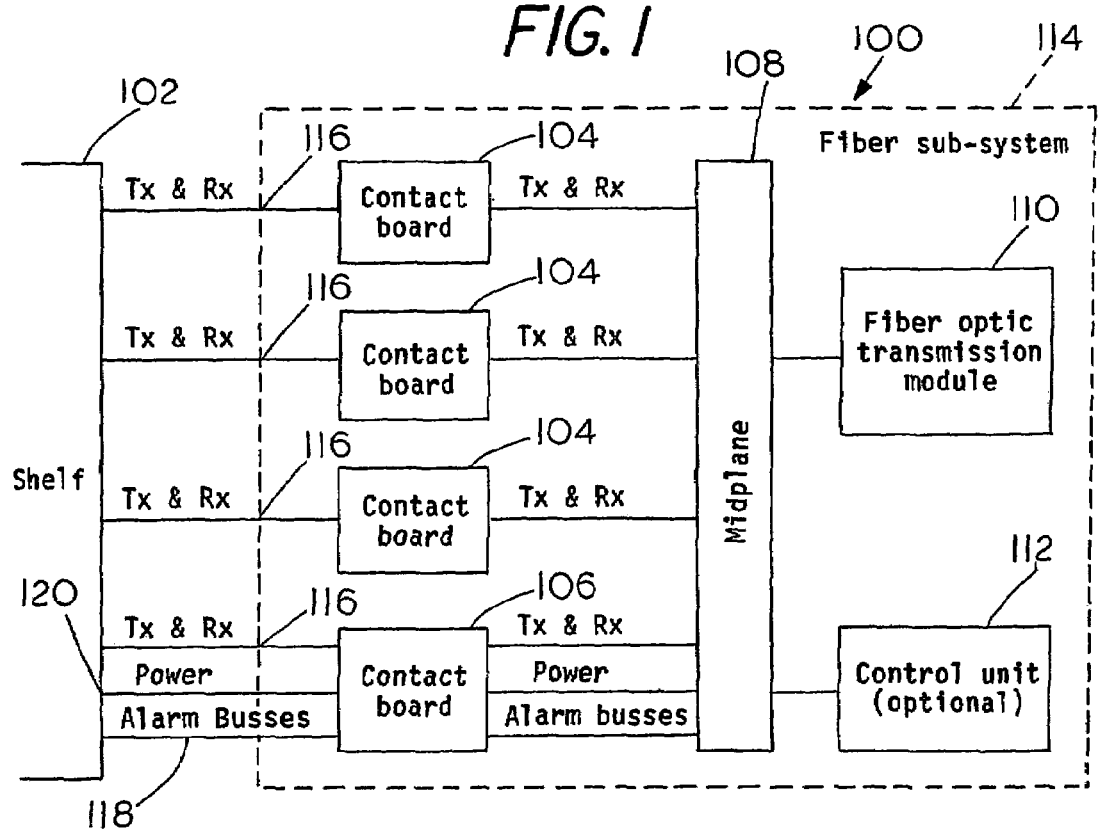
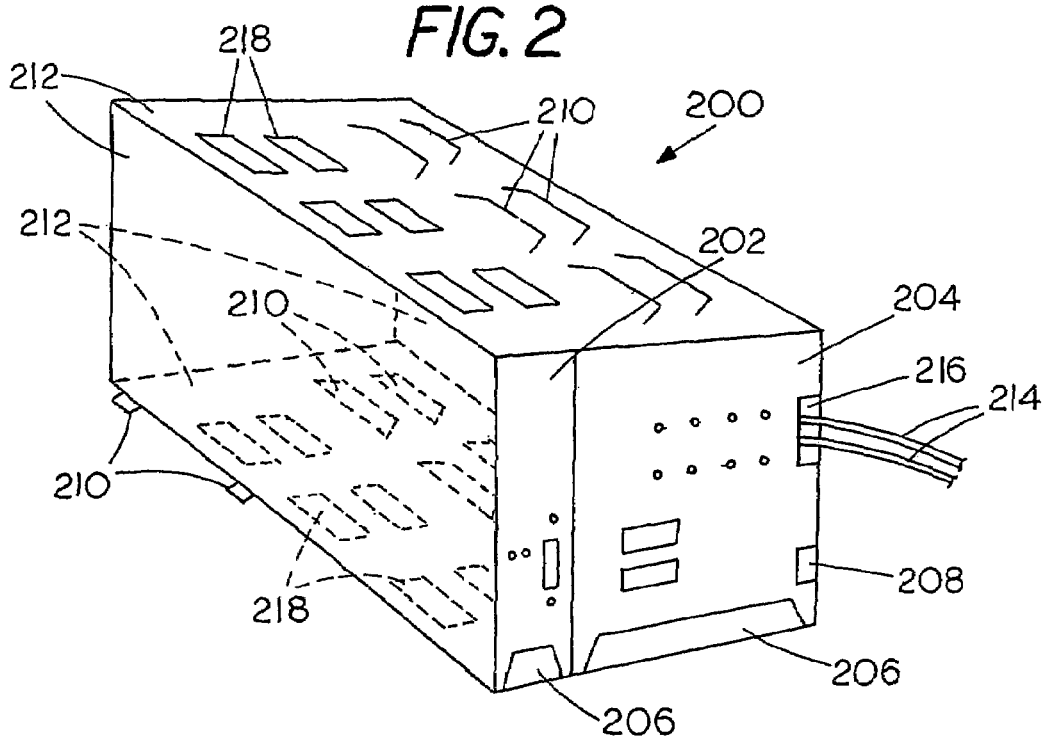

FIBER SUB-SYSTEM FOR A SHELF

BACKGROUND

Telecommunication service providers have historically deployed varying types of shelves, such as a 3190 series mechanics shelf, in remote cabinets to provide telephony services over copper wire. In some situations, such as providing network access to base stations, the environment can be very noisy. Fiber optic communications are more immune to such noisy environments than copper wires and can provide higher bandwidth services. It is, therefore, desirable to use fiber optic cable rather than copper wire.

Unfortunately, the mechanics shelves, such as the 3190 series shelf, are not able to connect to fiber optic networks. This is due, in part, to the older shelves having particular card connectors requiring certain configurations to which a fiber cable is not able to connect. Replacement of the copper wire and shelves is cost prohibitive. Likewise, installing additional shelves capable of connecting to fiber optic networks along side existing shelves is also cost prohibitive and not an efficient use of resources. Therefore, typical telecommunication service providers must choose between the benefits of fiber optic networks and the high cost of replacing older mechanics shelves.

SUMMARY

The above-mentioned problems and other problems are resolved by the present invention and will be understood by reading and studying the following specification.

In one embodiment, a fiber sub-system is provided. The fiber sub-system comprises a fiber optic transmission module, one or more contact boards adapted to couple to shelf interface connectors, and a midplane adapted to couple with the one or more contact boards and the fiber optic transmission module enabling communication between the one or more contact boards and the fiber optic transmission module without requiring modifications to the fiber optic transmission module. The fiber sub-system also comprises a shell for encapsulating the fiber optic transmission module, the one or more contact boards, and the midplane.

In another embodiment, a fiber sub-system is provided. The fiber sub-system comprises a fiber optic transmission module adapted to convert four electrical signals into a single optical signal for delivery over optical fiber, four contact boards each adapted to connect to an electrical signal through a shelf interface, and a midplane adapted to couple with the four contact boards and the fiber optic transmission module enabling communication between the four contact boards and the fiber optic transmission module without requiring modifications to the fiber optic transmission module. The fiber sub-system also comprises a shell for encapsulating the fiber optic transmission module, the four contact boards, and the midplane, the shell having guides to interface with shelf card guide slots for providing both translational and rotational support while inserting the shell into a shelf. The shell is adapted to fit into any four adjacent shelf card slots.

In yet another embodiment, a fiber sub-system is provided. The fiber sub-system comprises a fiber optic transmission module adapted to convert four DS-1 line speed signals into an optical DS-2 line speed signal, three contact boards each adapted to connect to a DS-1 line speed signal through a shelf interface, and a fourth contact board adapted to connect to a DS-1 line speed signal through the shelf interface, the fourth contact board being further adapted to connect to alarm busses and to a power line, wherein the fiber sub-system is powered by the power line connected to the fourth contact board. The fiber sub-system also comprises a control unit adapted to provide a craft interface for system management, and a midplane adapted to couple with the four contact boards and the fiber optic transmission module enabling communication between the four contact boards and the fiber optic transmission module without requiring modifications to the fiber optic transmission module, the midplane being further adapted to enable communication between the fiber optic transmission module and the control unit. The fiber sub-system further comprises a shell for encapsulating the fiber optic transmission module, the four contact boards, the control unit and the midplane, the shell having guides to interface with shelf card guide slots for providing both translational and rotational support while inserting the shell into a shelf, wherein the shell is adapted to fit into any four adjacent shelf card slots.

In another embodiment, a communications system is provided. The communications system comprises a shelf adapted to receive a plurality of line cards for processing and outputting electrical signals, and a fiber sub-system adapted to fit into line card slots in the shelf, the fiber sub-system converting between the shelf interface and an interface of a fiber optic transmission module such that fiber connectivity is provided to the shelf. The fiber sub-system comprises a midplane, a fiber optic transmission module coupled to the midplane, and a plurality of contact boards adapted to connect to the shelf interface and the midplane, wherein the contact boards map between the shelf interface connectors and the connectors of the midplane. The fiber sub-system further comprises a shell adapted to encapsulate the midplane, the fiber optic transmission module, and the plurality of contact boards, the shell having guides for providing both translational and rotational support while inserting the shell into the shelf.

In another embodiment, a method of manufacturing a fiber sub-system is provided. The method comprises adapting a shell to fit within the physical limits of N line card slots in a shelf, adapting N contact boards to fit within the shell, each of the N contact boards being further adapted to couple with the connectors of one of the N line card slots, wherein only one contact board is adapted to couple with a power line, and adapting a midplane to fit within the shell and couple with the N contact boards, wherein the N contact boards map the connectors of the N line card slots to the midplane connectors.

In yet another embodiment, a method of installing a fiber sub-system is provided. The method comprises inserting a midplane into a shell; inserting a plurality of contact boards into the shell, the plurality of contact boards being adapted to couple with connectors in shelf line card slots and with midplane connectors, wherein only one of the plurality of contact boards is adapted to couple with a power line; inserting a fiber optic transmission module into the shell, the fiber optic transmission module being coupled to the midplane, wherein the midplane is adapted to enable communication between the plurality of contact boards and the fiber optic transmission module; and inserting the shell into a plurality of line card slots in a shelf.

DRAWINGS

FIG. 1 is a block diagram of a communications system according to one embodiment of the present invention.

FIG. 2 is a diagram of a shell of a fiber sub-system according to one embodiment of the present invention.

DETAILED DESCRIPTION

Figure 3:
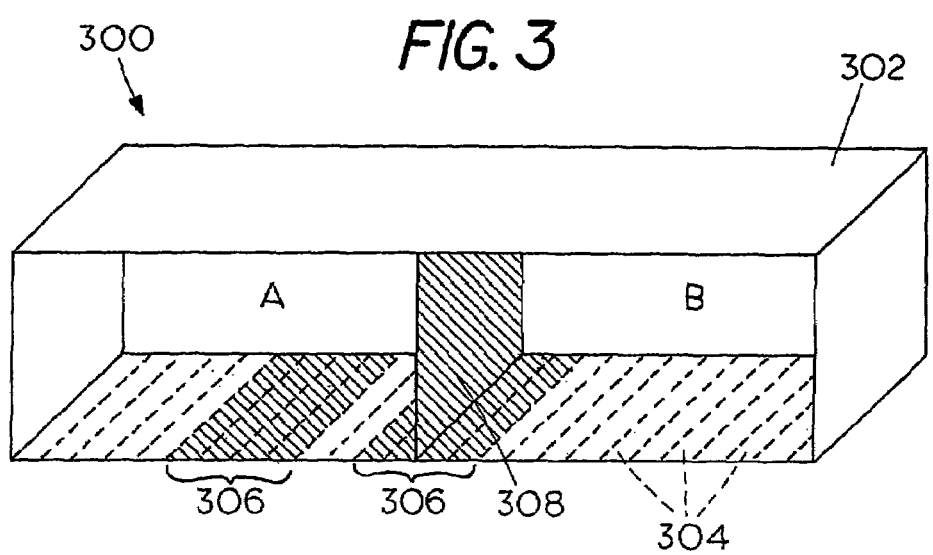
FIG. 3 is a diagram showing the position of a fiber sub-system in relation to a shelf according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention enable shelves originally installed for copper deployment to connect to and use fiber optic networks. This is accomplished by providing a fiber sub-system which installs into line card slots in the shelves. The fiber sub-system is adapted to connect with the required configurations of a plurality of shelf card slot interfaces and connect the signals received to a fiber optic transmission device which places the signals on a fiber optic cable. Therefore, embodiments of the present invention save the time and money required to replace deployed shelves and copper wiring with fiber optic networks, while enabling the higher bandwidth services that fiber optic networks provide.

FIG. 1 is a block diagram of a communications system 100 according to one embodiment of the present invention. Communications system 100 includes shelf 102 and fiber sub-system 114. Shelf 102 is originally adapted to receive a plurality of line cards for processing and outputting electrical signals. Fiber sub-system 114 is adapted to connect to an interface of shelf 102 and to fit inside card slots in shelf 102. Fiber sub-system 114 maps between an interface of shelf 102 and an interface of fiber optic transmission module 110 such that fiber connectivity is provided to shelf 102. For purposes of explanation only and not by way of limitation, fiber sub-system 114 is shown outside of shelf 102 in FIG. 1. In some embodiments, shelf 102 is a 3190 series mechanics shelf. In other embodiments, other mechanics shelves are used. Additionally, in some embodiments, shelf 102 is unmanaged.

Contact boards 104 and contact board 106 in fiber sub-system 114 each connect to a transmission and reception line pair 116 through an interface of shelf 102. The signal received over transmission and reception pair 116 is an electrical signal. In some embodiments, the signal is carried over copper wire. In other embodiments, other transmission media are used. Contact boards 104 and contact board 106 map the shelf connectors to the connectors of midplane 108. In some embodiments, the shelf connectors are "goldfinger" type connectors. In such embodiments, contact boards 104 and contact board 106 map the "goldfinger" connectors to appropriate pins of midplane 108 connectors. In addition, contact board 106 maps connectors of alarm buses 118 and power line 120 to midplane 108.

Midplane 108 is adapted to couple contact boards 104 and 106 with fiber optic transmission module 110. By, coupling contact boards 104 and 106 to fiber optic transmission module 110 via midplane 108, embodiments of the present invention enable fiber sub-system 114 to fit within the physical space limitations of shelf 102. This advantage is achieved by enabling more freedom in the placement of fiber optic transmission module 110 and contact boards 104 and 106 since the latter two components are not directly connected. Additionally, midplane 108 routes power to contact boards 104, fiber optic transmission module 110 and control unit 112 from power line 120 coupled to contact board 106.

Although three contact boards 104 and one contact board 106 are shown in FIG. 1, it will be understood by one of skill in the art that N number of contact boards 104 and 106 are used in other embodiments. In some embodiments, alarm buses 118 include one or more of a system alarm bus, a fuse alarm bus, and a bit error rate (BER) bus. In some embodiments, the fiber sub-system 114 asserts an alarm over one of the buses by changing the voltage on the bus. For example, to assert the system bus, the fiber sub-system 114 pulls the voltage on system alarm bus to 0 volts DC.

Also connected to midplane 108 are fiber optic transmission module 110 and control unit 112. One example of a suitable control unit is ADC's SPX-SCU0A41 (SCU) unit. Control unit 112 provides system management to the communications system. For example, in some embodiments, shelf 102 is an unmanaged shelf. In some such embodiments, control unit 112 provides one or more of port monitoring, provisionable bit error rate (BER) threshold settings, system alarm provisioning, fuse alarm provisioning, a front panel display and remote monitoring. In addition, control unit 112 provides a craft interface in the front panel display for system management. Hence, in such embodiments, control unit 112 provides system management to previously unmanaged shelf 102. Control unit 112 and fiber optic transmission module 110 communicate via midplane 108. In some embodiments, control unit 112 is not included. In such embodiments, fiber optic transmission module 110 continues to function properly but system management provided by control unit 112 is not available.

Fiber optic transmission module 110 receives signals from and transmits signal to transmission and reception pair 116 coupled to each of contact boards 104 and 106 via midplane 108. Fiber optic transmission module 110 multiplexes and converts the received electrical signals for delivery over a single-mode optical fiber. One example of a suitable fiber optic transmission module is ADC's quad loop extender QLX-SCA-211 (QLX) module. In some embodiments, each of transmission and reception pairs 116 utilize a digital signal 1 (DS-1) line speed. By multiplexing signals from transmission and reception pairs 116, the output of fiber optic transmission module 110 utilizes an optical digital signal 2 (DS-2) line speed. Additionally, fiber optic transmission module 110 demultiplexes and converts received optical DS-2 signals to separate electrical DS-1 line speed signals. The demultiplexed DS-1 line speed signals are transmitted to transmission and reception pairs 116 via midplane 108 and contact boards 104 and 106.

Therefore, fiber sub-system 114 enables delivery of high speed optical signals to shelf 102 which is originally adapted only to receive and process lower speed electrical line signals. In enabling this improvement, embodiments of the present invention do not require any changes to shelf 102 itself. In fact, in some embodiments, fiber sub-system 114 is designed so that safety compliance, such as UL compliance, of shelf 102 is not affected by insertion of fiber sub-system 114 into shelf 102. This is accomplished, in part, due to a shell, shown in FIG. 2, for housing the components described above. The shell acts as a separate box apart from the shelf for housing components. Therefore, the "box-in-a-box" configuration does not alter the safety compliance of the shelf. In addition, midplane 108 is adapted to couple to fiber optic transmission module 110 without requiring modifications to fiber optic transmission module 110, such as not requiring modifications to the size, shape, and interfaces of fiber optic transmission module 110.

FIG. 2 is a diagram of a shell 200 of a fiber sub-system according to one embodiment of the present invention. Shell 200 is adapted to encapsulate a fiber optic transmission module, a control unit, a plurality of contact boards, and a midplane (each shown in FIG. 1). Shell 200 is adapted such that a fiber optic transmission module fits within shell 200 without requiring modifications to the physical size and shape of the fiber optic transmission module. Shell 200 facilitates insertion of a fiber sub-system into a shelf. Shell 200 has a plurality of sides 212. Sides 212 are made of one of plastic, aluminum, copper brass, steel, nickel, titanium, and any other suitable material for providing the functionality of sides 212 in shell 200. Also included in shell 200 are guides 210. In some embodiments, guides 210 are formed into one or more of sides 212. In other embodiments guides 210 are joined to one or more of sides 212. Additionally, in some embodiments, guides 210 are located on top and bottom sides of sides 212. In some such embodiments, as shown in FIG. 2, one or more guides 210 are located at the left edge of a bottom side of sides 212.

Guides 210 are formed to interface with card guide slots in a shelf. By interfacing with the line card guide slots, guides 210 help prevent the shell from twisting in any rotational degree of freedom (i.e. pitch, yaw and roll) and help prevent vertical and horizontal translational movement. In particular, guides 210 are designed to provide substantially continuous engagement with line card guide slots as shell 210 is inserted into a shelf. This substantially continuous engagement is accomplished by positioning guides 210 such that as one of guides 210 exits a line card guide slot in a shelf, another guide 210 is engaging the line card guide slot. Therefore, guides 210 align shell 200 vertically and horizontally and prevent shell 200 from getting off track and aligning with an adjacent line card guide slot.

Additionally, guides 210 are designed to be capable of interfacing with line card guide slots of varying shelves. For example, in some embodiments, guides 210 are designed to interface with line card guide slots of any shelf in the 3190 series mechanics shelves. This is accomplished, for example, with the 3190 series shelves by adapting shell 200 and guides 210 to fit a lowest common denominator in the 3190 series shelves while allowing for known deviations in the industry standard for 3190 series shelves. Additionally, in some embodiments in which sides 212 are made of an electrically conductive material, guides 210 are formed directly from sides 212 providing a ground connection to the shelf housing.

Also shown in FIG. 2 are front panel displays 202 and 204. Front panel display 202 is a front panel display for a control unit (shown in FIG. 1). The front panel provides a craft interface such that a user can connect to the control unit for system management. Front panel display 204 is a front panel for a fiber optic transmission module (shown in FIG. 1). Front panel display 204 provides status and alarm indicators. Front panel displays 202 and 204 are physically part of their respective control unit and fiber optic transmission module, even though front panel display 202 and 204 substantially close off one end of shell 200. In addition, latches 206 enable removal and replacement of the control unit and the fiber optic transmission module. Each of the fiber optic transmission module and the control unit are replaceable independent of each other and without requiring shell 200 to be removed from the shelf.

Slot 208 in shell 200 provides front access to a fuse. Therefore, shell 200 does not have to be removed from the shelf to replace the fuse. Slot 216 provides front access for fiber optic cables 214. Slots 218 in the top and bottom sides of sides 212 allow air flow through the fiber sub-system.

FIG. 3 is a diagram showing position of a fiber sub-system in relation to a shelf 302 according to one embodiment of the present invention. Sections 304 represent card slots in shelf 302. In some embodiments, shelf 302 is a 3190 series mechanics shelf. In other embodiments, shelf 302 is another appropriate type of shelf. Shaded sections 306 represent exemplary locations of a fiber sub-system. A shell (shown in FIG. 2), in some embodiments, is adapted to fit into any N adjacent card slots. In some embodiments, as shown in FIG. 3, a shell fits into any 4 adjacent card slots. In some embodiments, shelf 302 also includes power divider 308. Power divider 308 divides the shelf into two sections, each section receiving a different power source (labeled "A" power and "B" power in FIG. 3). Accessing both power sources has the potential of destroying an electrical component due to a difference in the voltages. Power divider 308 is designed to limit the possibility of accessing both power sources. However, embodiments of the present invention enable a fiber sub-system to cross over the barrier without risk of damage. As discussed above, in some embodiments, only one contact board accesses a power line. The other components of the fiber sub-system including the other contact boards, receive power through that same power line. Therefore, regardless of where the shell (and components housed in the shell) is placed, only one power source ("A" or "B") is accessed. Therefore, embodiments of the present invention enable removal of power divider 308 and the shell is able to be placed in any N adjacent card slots.

Figure 4:
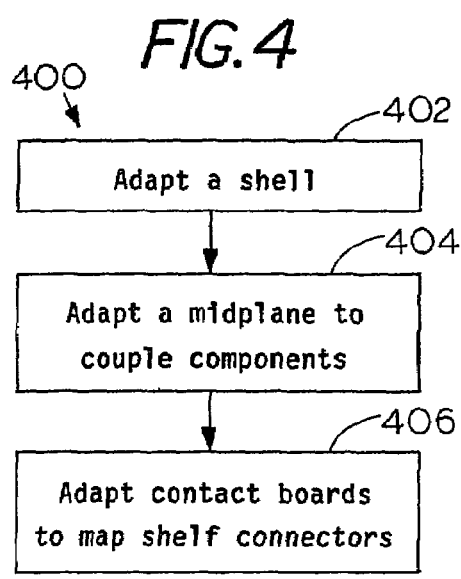
FIG. 4 is a flow chart showing a method of manufacturing a fiber sub-system according to one embodiment of the present invention.

FIG. 4 is a flow chart showing a method 400 of manufacturing a fiber sub-system according to one embodiment of the present invention. At 402, a shell is adapted to fit within the physical limits of N line card slots in a shelf. Adapting a shell to fit within the physical limits of N line card slots includes adapting the shell to engage guide slots in the shelf and line up ports of the shelf interface with ports of components in the shell. In some embodiments, this is accomplished by forming guides in the top and bottom of the shell, as described above. In some embodiments, a shell is adapted to fit within any 4 adjacent line card slots. Also, in some embodiments, adapting a shell includes adapting a shell to fit within the physical limits of N line card slots in any of various different shelves, as described above. In some such embodiments, the shell is adapted to fit within the physical limits of N line card slots in any shelf of the 3190 series mechanics shelves.

Additionally, in some embodiments, adapting a shell includes adapting the shell to house components, such as a fiber optic transmission module, without modifying the shape or size of the components. In some such embodiments, the shell is adapted to house a fiber optic transmission module without requiring modifications to the shape, size and interfaces of the fiber optic transmission module. In some such embodiments, the shell is adapted to house ADC's QLX module without modifying the shape, size and interfaces of the QLX module. In other embodiments, the shell is adapted to fit in the line card slots of the shelf, and the configuration (e.g. size and shape) of individual components, such as a fiber optic transmission module and control unit, are adapted to fit within the available physical space of the shell. Adapting a shell also includes, in some embodiments, adapting the shell with latches at the front of the shell to enable insertion and removal of components, such as a control unit and fiber optic transmission module, without having to remove the shell from a shelf.

At 404, a midplane is adapted to couple various components together including but not limited to, contact boards, a fiber optic transmission module and a control unit. For example, in some embodiments the midplane is adapted to couple a fiber optic transmission module to N contact boards. In some embodiments, adapting a midplane includes adapting the midplane to fit within the physical limits of available space in the shell. Additionally, in some embodiments, adapting a midplane further comprises adapting the midplane to route power and alarm buses from only one contact board coupled with a power line to other appropriate components. For example, in some embodiments, the midplane is adapted to route power from the one contact board coupled with a power line to other components. The midplane enables more freedom in choosing locations to place other components (e.g. the fiber optic transmission module and contact boards) since the other components do not have to be directly physically connected. In addition, the midplane is adapted, in some embodiments, to couple to the fiber optic transmission module without requiring modifications to the size, shape and interfaces of the fiber optic transmission module.

At 406, each of N contact boards is adapted to fit within the shell and to couple with the connectors of one of N shelf line card slots. The N contact boards are further adapted to map the line card slot connectors to the midplane's connectors. In some embodiments, the N contact boards are adapted to connect to goldfinger connectors in the line card slots. Additionally, in some embodiments, adapting N contact boards includes adapting only one contact board to couple to alarm buses and a power line. In such embodiments, the contact board coupled to alarm buses and a power line is adapted to map the alarm buses and power connectors to the midplane connectors. The midplane is also further adapted to route the alarm buses and power connectors to the appropriate components. For example, in some embodiments, the midplane routes alarm bus signals from the one contact board to a control unit and enables the control unit to assert alarms over the alarm bus.

Figure 5:
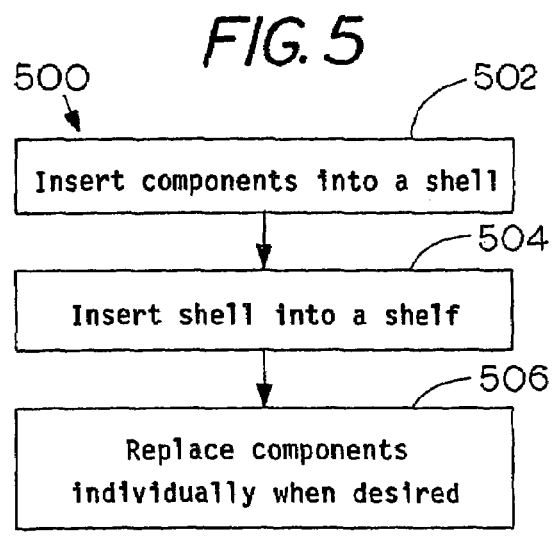
FIG. 5 is a flow chart showing a method of installing a fiber sub-system according to one embodiment of the present invention.

FIG. 5 is a flow chart showing a method 500 of installing a fiber sub-system according to one embodiment of the present invention. At 502, components are inserted into a shell adapted to fit within a plurality of line card slots of a shelf. In some embodiments, the shell is further adapted with guides to interface with shelf card guide slots providing both translational and rotational support while inserting the shell into a shelf. Inserting components includes inserting one or more of a fiber optic transmission module, contact boards, a midplane, and a control unit for system management. The plurality of contact boards are adapted to couple with connectors in the shelf line card slots and midplane connectors. Additionally, in some embodiments, only one of the plurality of contact boards is adapted to connect with a power line, as described above. The midplane is adapted to couple with and enable communication between the other components. For example, the midplane enables communication between the plurality of contact boards and the fiber optic transmission module.

At 504, the shell is inserted into a plurality of line card slots in a shelf. In some embodiments, shell guides provide translational and rotational support to the shell within the shelf and help to line up connectors in the line card slots with contact board connectors. At 506, components, such as a control unit and a fiber optic transmission module, are replaced when desired without removing the shell from the shelf. For example, when a component ceases to function properly, the malfunctioning component is removed from the shell and replaced with a functioning component without removing the shell from the shelf. In some embodiments, this is accomplished by using a latch on the front panel of the shell to lock and release components inserted into the shell.

As described above, embodiments of the present invention provide a needed benefit of enabling shelves originally designed for lower speed electrical signal transmission to connect to and utilize high speed fiber connections without requiring that the shelves be modified. Therefore, time and money are saved by not having to replace already deployed shelves and wiring.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fiber sub-system comprising:
a fiber optic transmission module;
one or more contact boards adapted to couple to shelf interface connectors;
a midplane adapted to couple with the one or more contact boards and the fiber optic transmission module enabling communication between the one or more contact boards and the fiber optic transmission module without requiring modifications to the fiber optic transmission module; and
a shell for encapsulating the fiber optic transmission module, the one or more contact boards, and the midplane; wherein the shell comprises guides for interfacing with shelf card guide slots, the guides providing both translational and rotational support while inserting the shell into a shelf.

2. The fiber sub-system of claim 1, wherein the fiber optic transmission module is a quad loop extender (QLX) module.

3. The fiber sub-system of claim 1, wherein the fiber optic transmission module is adapted to convert a plurality of DS-1 line speed signals into an optical DS-2 line speed signal for delivery over a single-mode optical fiber.

4. The fiber sub-system of claim 1, wherein the shell is adapted to allow the fiber optic transmission module to be replaced without removing the shell from a shelf.

5. The fiber sub-system of claim 1, wherein the midplane is adapted to couple to the fiber optic transmission module without requiring modifications to one or more of the fiber optic transmission module's size, shape, and interfaces.

6. The fiber sub-system of claim 1, wherein the shell is made of one of plastic, aluminum, copper brass, steel, nickel, and titanium.

7. The fiber sub-system of claim 1, wherein the one or more contact boards coupled to a shelf interface comprise four contact boards.

8. The fiber sub-system of claim 7, wherein the four contact boards further comprise:
three contact boards each coupled to a DS-1 line speed signal; and
one contact board coupled to a DS-1 line speed signal, a power line, and alarm busses.

9. The fiber sub-system of claim 7, wherein the shell is further adapted to occupy any four adjacent card slots in the shelf.

10. The fiber sub-system of claim 1, further comprising:
a control unit coupled to the midplane and adapted to provide a craft interface for system management.

11. The fiber sub-system of claim 10, wherein the control unit is adapted to provide a craft interface for system management through one or more of port monitoring, provisionable bit error rate (BER) threshold settings, system alarm provisioning, a front panel display and remote monitoring.

12. The fiber sub-system of claim 10, wherein shell is adapted to allow the control unit to be replaced without removing the shell from the shelf.

13. The fiber sub-system of claim 10, wherein the midplane is further adapted to enable communication between the control unit and the fiber optic transmission module.

14. A fiber sub-system comprising:
a fiber optic transmission module adapted to convert four electrical signals into a single optical signal for delivery over optical fiber;
four contact boards each adapted to connect to an electrical signal through a shelf interface;
a midplane adapted to couple with the four contact boards and the fiber optic transmission module enabling communication between the four contact boards and the fiber optic transmission module without requiring modifications to the fiber optic transmission module; and
a shell for encapsulating the fiber optic transmission module, the four contact boards, and the midplane, the shell having guides to interface with shelf card guide slots for providing both translational and rotational support while inserting the shell into a shelf, wherein the shell is adapted to fit into any four adjacent shelf card slots.

15. The fiber sub-system of claim 14, wherein the fiber optic transmission module is a quad loop extender (QLX) module.

16. The fiber sub-system of claim 14, wherein the shell is adapted to allow the fiber optic transmission module to be replaced without removing the shell from the shelf.

17. The fiber sub-system of claim 14, wherein the four contact boards further comprise:
three contact boards each coupled to an electrical signal; and
a fourth contact board coupled to an electrical signal, a power line, and alarm busses; wherein the fiber sub-system is powered from the power connection through the fourth contact board.

18. The fiber sub-system of claim 14, further comprising:
a control unit coupled to the midplane and adapted to provide a craft interface for system management.

19. The fiber sub-system of claim 18, wherein the control unit is adapted to provide a craft interface for system management through one or more of port monitoring, provisionable bit error rate (BER) threshold settings, system alarm provisioning, a front panel display and remote monitoring.

20. The fiber sub-system of claim 18, wherein the midplane is further adapted to enable communication between the control unit and the fiber optic transmission module.

21. The fiber sub-system of claim 18, wherein the shell is adapted to allow the control unit to be replaced without removing the shell from the shelf.

22. A fiber sub-system comprising:
a fiber optic transmission module adapted to convert four DS-1 line speed signals into an optical DS-2 line speed signal;
three contact boards each adapted to connect to a DS-1 line speed signal through a shelf interface;
a fourth contact board adapted to connect to a DS-1 line speed signal through the shelf interface, the fourth contact board being further adapted to connect to alarm busses and to a power line, wherein the fiber sub-system is powered by the power line connected to the fourth contact board;
a control unit adapted to provide a craft interface for system management;
a midplane adapted to couple with the four contact boards and the fiber optic transmission module enabling communication between the four contact boards and the fiber optic transmission module without requiring modifications to the fiber optic transmission module, the midplane being further adapted to enable communication between the fiber optic transmission module and the control unit; and
a shell for encapsulating the fiber optic transmission module, the four contact boards, the control unit and the midplane, the shell having guides to interface with shelf card guide slots for providing both translational and rotational support while inserting the shell into a shelf, wherein the shell is adapted to fit into any four adjacent shelf card slots.

23. The fiber sub-system of claim 22, wherein the shell is adapted to allow the fiber optic transmission module to be replaced without removing the shell from the shelf.

24. The fiber sub-system of claim 22, wherein the control unit is adapted to provide a craft interface for system management through one or more of port monitoring, provisionable bit error rate (BER) threshold settings, system alarm provisioning, a front panel display and remote monitoring.

25. A communications system comprising:
a shelf adapted to receive a plurality of line cards for processing and outputting electrical signals; and
a fiber sub-system adapted to fit into line card slots in the shelf, the fiber sub-system converting between the shelf interface and an interface of a fiber optic transmission module such that fiber connectivity is provided to the shelf, wherein the fiber sub-system comprises:
a midplane;
a fiber optic transmission module coupled to the midplane;
a plurality of contact boards adapted to connect to the shelf interface and the midplane, wherein the contact boards map between the shelf interface connectors and the connectors of the midplane; and
a shell adapted to encapsulate the midplane, the fiber optic transmission module and the plurality of contact boards, the shell having guides for providing both translational and rotational support while inserting the shell into the shelf.

26. The communications system of claim 25, wherein the shelf is an unmanaged 3190 series shelf.

27. The communications system of claim 25, wherein the shell is adapted to allow the fiber optic transmission module to be replaced without removing the fiber sub-system from the shelf.

28. The communications system of claim 25, wherein the fiber sub-system further comprises: a control unit coupled to the midplane, the control unit having a craft interface for providing management functionality to the shelf.

29. The communications system of claim 28, wherein the shell is adapted to allow control unit to be replaced without removing the fiber sub-system from the shelf.

30. The communications system of claim 28, wherein the midplane is further adapted to enable communication between the control unit and the fiber optic transmission module.

31. The communications system of claim 25, wherein the fiber sub-system is adapted to occupy any four adjacent card slots in the shelf.

32. The communications system of claim 31, wherein the plurality of contact boards further comprise:
   three contact boards each coupled to a DS-1 line speed signal; and
   a fourth contact board coupled to a DS-1 line speed signal, a power line, and alarm busses; wherein the fiber sub-system is powered from the power connection through the fourth contact board.

33. A method of manufacturing a fiber sub-system, the method comprising:
   adapting a shell to fit within the physical limits of N line card slots in a shelf;
   adapting N contact boards to fit within the shell, each of the N contact boards being further adapted to couple with the connectors of one of the N line card slots, wherein only one contact board is adapted to couple with a power line; and
   adapting a midplane to fit within the shell and couple with the N contact boards, wherein the N contact boards map the connectors of the N line card slots to the midplane connectors.

34. The method of claim 33, wherein adapting a shell further comprises adapting the shell to fit within the physical limits of N line card slots in any shelf of a 3190 series mechanics shelves.

35. The method of claim 33, wherein adapting the N contact boards further comprises: adapting the N contact boards to connect to goldfinger connectors in the N line card slots.

36. The method of claim 33, wherein adapting the midplane further comprises:
   adapting the midplane to route power from the one contact board coupled with a power line to other components.

37. The method of claim 33, further comprising:
   adapting the shell to house a fiber optic transmission module and a control unit, wherein the fiber optic transmission module and the control unit are removable from the shell without removing the shell from the shelf.

38. A method of installing a fiber sub-system, the method comprising:
   inserting a midplane into a shell;
   inserting a plurality of contact boards into the shell, the plurality of contact boards being adapted to couple with connectors in shelf line card slots and with midplane connectors, wherein only one of the plurality of contact boards is adapted to couple with a power line;
   inserting a fiber optic transmission module into the shell, the fiber optic transmission module being coupled to the midplane, wherein the midplane is adapted to enable communication between the plurality of contact boards and the fiber optic transmission module; and
   inserting the shell into a plurality of line card slots in a shelf.

39. The method of claim 38, wherein inserting a plurality of contact board further comprises inserting four contact boards into the shell.

40. The method of claim 38, wherein inserting the shell further comprises inserting a shell having guides for providing both translational and rotational support while inserting the shell into a shelf.

41. The method of claim 38, further comprising:
   inserting a control unit for system management into the shell, the control unit being coupled to the midplane.

42. The method of claim 41, further comprising:
   replacing one of a fiber optic transmission module and a control unit in the shell when desired without removing the shell from the shelf.

43. A fiber sub-system comprising:
   a fiber optic transmission module;
   a plurality of contact boards adapted to couple to shelf interface connectors, wherein only one of the plurality of contact boards is coupled to a power line;
   a midplane adapted to couple with the plurality of contact boards and the fiber optic transmission module enabling communication between the plurality of contact boards and the fiber optic transmission module; and
   a shell for encapsulating the fiber optic transmission module, the plurality of contact boards, and the midplane.

* * * * *